May 7, 1968  H. H. BALL  3,381,534
FLOAT TYPE LIQUID DEPTH MEASURING DEVICE
Filed Sept. 20, 1965
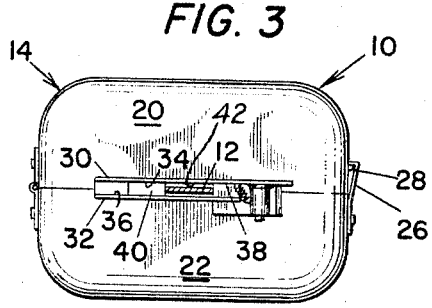
FIG. 3
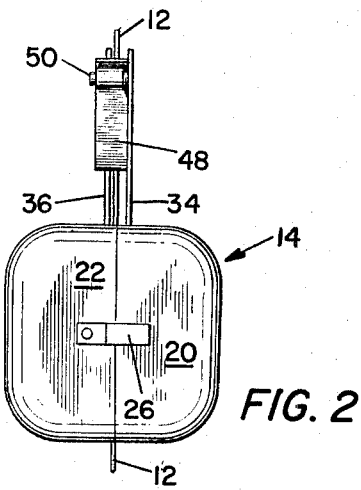
FIG. 2
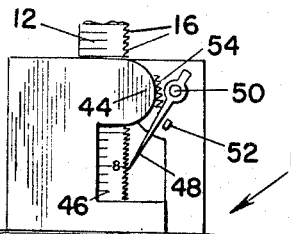
FIG. 1
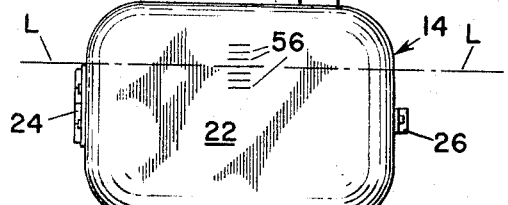
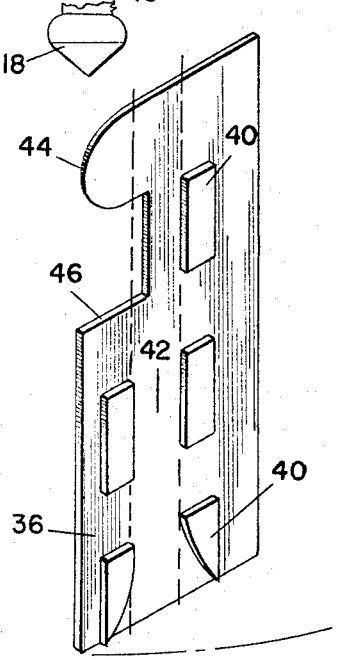
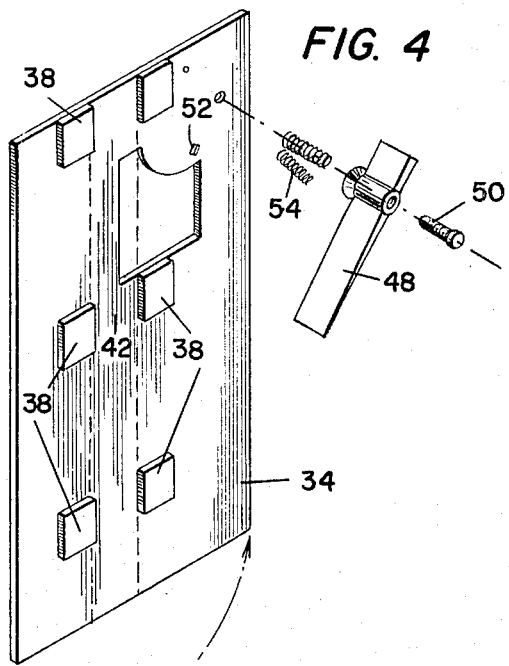
INVENTOR,
Hersey H. Ball
Raymond N. Matson
HIS PATENT AGENT

United States Patent Office 3,381,534
Patented May 7, 1968

3,381,534
FLOAT TYPE LIQUID DEPTH MEASURING DEVICE
Hersey H. Ball, P.O. Box 636,
Cotton Valley, La. 71018
Filed Sept. 20, 1965, Ser. No. 488,415
4 Claims. (Cl. 73—315)

ABSTRACT OF THE DISCLOSURE

A device for measuring the depth of a liquid comprising a float having two cooperating sections to associate with and guide a measuring tape and to indicate therewith the depth of the liquid in which the float is placed.

This invention relates generally to liquid level or depth measuring devices for determining the amount of a liquid such as gasoline, kerosene, jet fuel, etc. in a tank and more particularly to an improved device of the type employing a float and measuring tape.

Measuring tapes and floats of various types for measuring tank liquid depths are known in the art but insofar as is known, these have been characterized by one or more disadvantageous features. Among these are: an inability to provide an accurate depth reading due to the color of the liquid and the resultant liquid level not showing up well on the measuring tape, to the tendency of the fluid to climb up the tape, to the tendency of light liquids to evaporate before the tape can be retrieved, to the use of chalk on the tape which becomes saturated in rainy weather before the tape can be inserted in the tank, or to the use of ineffective friction means to clamp a float to the very smooth tape at the liquid level so that the float slips upon sudden movement or slight jarring; a lack of suitability for use with all sizes and types of tanks or liquids; an impractical construction making the measuring device clumsy to use or to store; and an excessive cost and short life in use.

Accordingly, the main object of the present invention is to provide an improved depth measuring device of the measuring tape and float type which will obviate the above and other disadvantageous features characterizing known measuring devices of this type.

An important object of the present invention is to provide an improved tank liquid depth measuring device having a novelly constructed float for cooperation with a liquid depth measuring tape and which may be readily associated with or disassociated from the tape, and which float bears indicia indicating the liquid depth correction to be made for liquids having different specific gravities.

Another important object of the present invention is to provide an improved tank liquid depth measuring device of the relatively movable float and measuring tape type wherein the float may be automatically and temporarily positively connected to the tape for removal from the tank for an exact reading of the liquid depth when the tape end is at the bottom of the tank and the float is at the liquid level.

A further important object of the present invention is to provide a measuring device of the type described which will be accurate and simple to use, susceptible of ready and economic manufacture, and of low cost and long life.

Other objects and advantages of the invention will become apparent during the course of the following description.

In the drawings I have shown one embodiment of the invention. In this showing:

FIGURE 1 is a side elevational view of the invention showing the measuring tape in operative position within the float so as to be downwardly movable with respect thereto and automatically locked thereto against relative upward movement;

FIGURE 2 is an end elevation view thereof;

FIGURE 3 is a top plan view thereof; and

FIGURE 4 is a diagrammatic view to an enlarged scale illustrating how the cooperating guide-block-supporting plates fixed to the inner faces of the float sections move together upon pivoted movement of the sections to define the measuring tape confining slot.

Referring to the drawings, numeral 10 designates the present invention as a whole which comprises an elongated, flat measuring tape 12 which may be of steel or other suitable metal and is preferably marked off in feet, inches, and fractions thereof, and a float 14.

As shown in FIGURE 1, the entire length of an edge surface of the tape 12 is provided with regularly spaced notches 16 for a purpose to be described. The upper length of the tape 12 is reeled on a standard, hand operated reel (not shown) while the bottom end of the tape is provided with a weight or plumb bob 18 the length of which is included in the tape calibrations.

The float 14 which may be formed of any suitable light weight metal such as copper or aluminum, or of plastic, etc. and comprises two identical but complementary sections 20, 22 connected at one end by a hinge 24 having a vertical pintle, and at the other end by a spring latch 26 engaging a lug 28. The inner face of each float section is provided with recesses 30, 32 which extend to an open on the top and bottom surfaces of the float 14.

Plates 34, 36 are respectively attached to the faces of the recesses 30, 32 and extend from the bottom surface of the float 14 upwardly substantially above its upper surface. The adjacent surfaces of the plates 34, 36 have a plurality of thin guide blocks 38, 40 respectively fixed theseto and these are laterally spaced to define a measuring tape guide slot 42 therebetween (FIGURES 3 and 4). The blocks are of greater thickness than the tape 12 and the blocks on one plate are vertically staggered with respect to the blocks on the other plate so that all blocks on either plate abut the surface of the other.

The plate 36 is cut shorter at its upper end as at 44 than the plate 34 in order to accommodate a spring actuated pawl to be described and to define a window or opening 46 for reading the tape graduations. A pawl 48 is pivoted by a screw 50 to the upper right hand corner of the guide block supporting plate 34 and its downward movement is limited by a stop 52. When the measuring tape 12 is in the slot 42, the lower or outer end of the pawl 48 is resiliently urged against the tape notches 16 by a spring 54 so as to permit tape movement downwardly but not upwardly.

It is to be noted that the tape is marked and calibrated so that the point of contact of the pawl 48 with the notches 16 gives the precise distance from the bottom of a tank to the level L of the liquid contained therein. The float is provided on its side with markings 56 indicating the corrections to be added or subtracted for fluids of different specific gravities.

The operation of the invention is believed to be apparent. Upon the removal of the access cover of a tank containing a liquid the depth of which is to be measured, the latch 26 of the float 14 is released, the sections 20, 22 are swung apart about their hinge 24, and a portion of the tape 12 just above the lower end or plumb bob 18 is inserted in the slot 42 upon which the sections are swung together and latched so as to encircle or confine the tape within the slot. As set forth, the tape may now move downwardly through the slot with respect to the float but upward movement is prevented by the pawl 48.

The tape and the float is now lowered into the tank and when the buoyont float reaches the liquid, it floats therein at its surface or liquid level. The tape is lowered further into the tank through the float slot until its bottom end or bob touches the tank bottom upon which it is raised or reeled in. Simultaneously therewith, the pawl 48 engages one of the notches 16 in the end surface of the tape 12 to lock the tape and the float together so that they may be both withdrawn from the tank for an accurate reading of the depth of fluid therein as indicated by the point of engagement of the pawl with the tape.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:

1. A device for measuring the depth of liquid in a tank comprising, in combination, a float having top and bottom surfaces and comprsing a pair of pivotally conected float sections, the inner faces of said sections including complementary recesses extending vertically and connecting said surfaces; a plate fixed to the face of each of said recesses and having staggered, vertically and horizontally spaced guide blocks fixed thereto and cooperating to define a measuring tape guide slot; a measuring tape insertable in said slot for movement through the float to the bottom of the liquid; and means attached to said float engageable with said tape and operative to retain it immovable upon withdrawal of the device from the liquid.

2. The combination recited in claim 1 wherein said tape includes a plurality of regularly spaced notches and said engageable means comprises a pawl pivotally mounted on one of said plates adjacent to said tape.

3. The combination recited in claim 2, and spring means connecting said pawl and said plate and urging said pawl into engagement with said notches to prevent upward movement of said tape through said float.

4. The combination recited in claim 1 wherein said pivotally connected float sections include a detachable connection at their ends opposite from their pivotal connections to permit insertion and removal of said tape into and out of said guide slot.

References Cited

UNITED STATES PATENTS

| | | | |
|---|---|---|---|
| 411,808 | 10/1889 | Hall | 73—315 |
| 1,417,892 | 5/1922 | Ehrentraut | 73—315 X |
| 1,546,409 | 7/1925 | Schmidt | 73—315 |
| 2,340,616 | 2/1944 | Savko | 73—315 |
| 3,107,451 | 10/1963 | Sitzler et al. | 43—44.87 |

LOUIS R. PRINCE, *Primary Examiner.*

D. M. YASICH, *Assistant Examiner.*